United States Patent
Orito et al.

(10) Patent No.: US 7,794,853 B2
(45) Date of Patent: Sep. 14, 2010

(54) POROUS TITANIUM HAVING LOW CONTACT RESISTANCE

(75) Inventors: Kenji Orito, Saitama (JP); Toshiharu Hayashi, Naka-gun (JP); Masahiro Wada, Ageo (JP); Reiko Izumi, Mito (JP); Koji Hoshino, Kounosu (JP)

(73) Assignee: Mitsubishi Materials Corporation, Tokyo (JP)

( * ) Notice: Subject to any disclaimer, the term of this patent is extended or adjusted under 35 U.S.C. 154(b) by 0 days.

(21) Appl. No.: 12/518,509

(22) PCT Filed: Dec. 13, 2007

(86) PCT No.: PCT/JP2007/074038
§ 371 (c)(1),
(2), (4) Date: Jun. 10, 2009

(87) PCT Pub. No.: WO2008/072697
PCT Pub. Date: Jun. 19, 2008

(65) Prior Publication Data
US 2010/0015507 A1    Jan. 21, 2010

(30) Foreign Application Priority Data
Dec. 13, 2006   (JP) .............................. 2006-335609
Nov. 12, 2007   (JP) .............................. 2007-292956

(51) Int. Cl.
*B32B 15/01*   (2006.01)
*B32B 15/02*   (2006.01)
*B32B 15/04*   (2006.01)
*B32B 18/00*   (2006.01)

(52) U.S. Cl. ...................... 428/613; 428/660; 428/672; 977/762; 977/810; 977/811

(58) Field of Classification Search ................. 428/613, 428/615, 660, 672, 548, 550, 559, 567, 213, 428/215, 332, 336
See application file for complete search history.

(56) References Cited

FOREIGN PATENT DOCUMENTS

| CA | 2300008 A1 | 9/2000 |
|----|-----------|--------|
| JP | 2001-006713 A | 1/2001 |
| JP | 2004-134276 A | 4/2004 |
| JP | 2004-211190 A | 7/2004 |
| JP | 2007-107091 A | 4/2007 |
| WO | WO 2008/060293 | * 5/2008 |

OTHER PUBLICATIONS

Machine Translation, Orito et al. JP 2007-107091, Apr. 2007.*

* cited by examiner

*Primary Examiner*—Michael La Villa
(74) *Attorney, Agent, or Firm*—Leason Ellis LLP.

(57) ABSTRACT

Porous titanium having a low contact resistance includes porous titanium body, Au, and Ti oxide layer (3). Porous titanium includes continuous holes (1) opening on a surface and being connected to inner holes and a skeleton (2). Au adheres to at least an outer skeletal surface (4) of the porous titanium via diffusion bonding to form a network structure. The Ti oxide layer (3) is formed in a clearance between adjacent Au cords (5) of the Au network sticking. The width of an Au cord (5) of the Au network is 0.3 to 10 μm at least at one position; and the thickness of the Ti oxide layer (3), which is formed in the clearance between adjacent Au cords (5) of the Au network is 30 to 150 nm.

4 Claims, 7 Drawing Sheets

POROUS TITANIUM HAVING LOW CONTACT RESISTANCE

CROSS-REFERENCE TO PRIOR APPLICATION

This is the U.S. National Phase Application under 35 U.S.C. §371 of International Patent Application No. PCT/JP2007/074038 filed Dec. 13, 2007, which claims the benefit of Japanese Patent Application Nos. 2006-335609 filed Dec. 13, 2006 and 2007-292956 filed on Nov. 12, 2007, all of which are incorporated by reference herein. The International Application was published in Japanese on Jun. 19, 2008 as WO2008/072697 A1 under PCT article 21(2).

TECHNICAL FIELD

The present invention relates to porous titanium having a low contact resistance in which Au adheres to at least an outer surface of the skeletal structure of the porous titanium body via diffusion bonding to form a continuous network structure. The porous titanium is used for an air electrode and a fuel electrode of a polymer electrolyte fuel cell.

BACKGROUND ART

A polymer electrolyte fuel cell usually has an air electrode provided at one side of an electrolyte and a fuel electrode provided at the other side of the electrolyte. The air electrode and the fuel electrode are both formed from a conductive porous body with a catalyst. In general, a plurality of such structures is stacked together via separators to form a polymer electrolyte fuel cell. The air electrodes and the first separators are in contact with each other, and the fuel electrodes and the second separators are in contact with each other. Contact resistance therebetween should be low. The separator is commonly a carbon plate or a metal plate. Examples of the conductive porous body for forming the air electrode and the fuel electrode include nonwoven fabric of carbon fiber which is called carbon paper, and porous metal, and so on. If a metal plate, such as a titanium plate, is employed as the separator for the polymer electrolyte fuel cell, the titanium plate is plated with Au in order to reduce contact resistance that may be high in a use environment due to an oxide layer having high electrical resistance formed on the titanium surface. Such an Au-plated titanium plate is heat-treated to reduce the contact resistance (see Patent Document 1).

A known method of forming an Au coating on the surface of the titanium plate includes depositing Au after removing a Ti oxide layer formed on the titanium plate (see Patent Document 2).

It has been considered to employ porous titanium having great corrosion resistance as a conductive porous body for the air electrode and the fuel electrode of the polymer electrolyte fuel cell. Porous titanium usually includes continuous holes 1 opening on the surface and being connected to inner holes and a skeleton 2, as shown in FIG. 7. An enlarged view of area A of the skeleton 2 of the porous titanium in FIG. 7 is shown in FIG. 8. As shown in FIG. 8, a Ti oxide layer 3 is naturally developed on a surface of the skeleton 2 of the porous titanium when the porous titanium is left in the atmosphere. In particular the Ti oxide layer 3 formed on an outer skeletal surface 4 of the porous titanium is known to lower conductivity and thus increase contact resistance. When the porous titanium is used for the air electrode and the fuel electrode of the polymer electrolyte fuel cell, it is therefore preferable to employ the porous titanium having Au coating on the surface as in the separator.

Patent Document 1: Japanese Unexamined Patent Application, First Publication No. 2004-134276

Patent Document 2: Japanese Unexamined Patent Application, First Publication No. 2001-6713

DISCLOSURE OF INVENTION

Problems to be Solved by the Invention

The surface of the porous titanium has continuous holes connected to the inside at the porosity of not less than 60%. When depositing Au on the surface of the porous titanium by plating, a CVD process, a PVD process or other methods, the Au coating is formed not only on the entire outer skeletal surface but the entire inner skeletal surface of the porous titanium. Since the Au coating is formed also on the inner skeletal surface, which is not a contact portion, an excessively large amount of costly Au is consumed.

The polymer electrolyte fuel cell is often used as a power source of mobile devices, such as portable notebook personal computers and mobile phones, and is thus frequently subject to vibration. When the polymer electrolyte fuel cell in which the porous titanium having the Au coating deposited by plating, a CVD process, a PVD process or other methods on the outer skeletal surface is used for the air electrode and the fuel electrode is subject to vibration, a surface of the Au coating on the outer skeletal surface of the air electrode and the fuel electrode that is in contact with the separator is often deformed or peeled off, thereby increasing the contact resistance. The porous titanium-made air electrode and the fuel electrode of the polymer electrolyte fuel cell have porosity and their substantial outer areas are thus extremely small. If the surface of the Au coating is deformed or peeled off, the contact resistance increases significantly as compared with ordinary air electrodes and fuel electrodes in which the Au coating is formed in the entire surface of the titanium metal.

Means for Solving the Problems

Under these circumstances, the present inventors have conducted research to produce porous titanium having great conductivity to be used for the air electrode and the fuel electrode of the polymer electrolyte fuel cell at a lower cost and to provide porous titanium in which Au formed on the outer skeletal surface thereof is not deformed or peeled off even if subject to wear resulting from vibration and therefore the contact resistance does not become high for a long time. As a result, they discovered the following.

(A) An amount of a costly Au colloid liquid used can be reduced when applied to the outer surface of the skeletal structure of the porous titanium body since the Au colloid liquid is not applied deep in the hole opening. If the Au colloid liquid is dried in a short time as possible after application, the applied Au colloid aggregates during drying and Au adheres to the outer surface of the skeletal structure of the porous titanium body to form a network structure.

(B) When the porous titanium with Au sticking to the outer skeletal surface to form a network structure is heated at a temperature higher than 300° C. in a vacuum or inert gas atmosphere, oxygen included in the Ti oxide layer formed on the outer skeletal surface diffuses into underlying titanium to form solid solution, and metallic titanium is generated on the outer surface of the skeletal structure of the porous titanium body. When continuously heated under the same condition, Au scattering and sticking at least to the outer skeletal surface adheres via diffusion bonding to the outer skeletal surface formed of the titanium metal, and adheres firmly to the outer skeletal surface to form a network structure.

(C) When the porous titanium with Au sticking via diffusion bonding to the outer skeletal surface of the titanium metal to form a network structure is maintained in the ambient atmosphere or then subjected to optional heating, a Ti oxide layer is formed in a clearance where no Au network sticking via diffusion bonding to the outer skeletal surface formed of titanium metal exists. Such a hard Ti oxide layer helps reduce wear and deformation due to vibration, thereby preventing an increase in contact resistance caused by vibration.

(D) If the width of the Au cord of the Au network is too narrow, the contact resistance becomes high when the porous titanium is immersed in a sulfuric acid solution for a prolonged time. The width of the Au cord should therefore be not narrower than 0.3 μm at least at one position. If the width of the Au cord is not narrower than 0.3 μm at least at one position, the contact resistance hardly becomes high even if the porous titanium is immersed in a sulfuric acid solution for a prolonged time. The width of the Au cord is preferably in a range of 0.3 to 10 μm in consideration of the width of the outer surface of the skeletal structure of the porous titanium body.

(E) The Ti oxide layer formed in the clearance between adjacent Au cords of the Au network should have a thickness of 30 to 150 nm.

The present invention has been made in view of the aforementioned knowledge, and has the following configurations.

(1) Porous titanium having a low contact resistance comprising:
a porous titanium body having a skeletal structure and continuous holes that opens on an outer surface of the porous titanium body and are connected to each other to form inner holes;
an Au network formed on at least an outer surface of the skeletal structure of the porous titanium body as a continuous network structure by adhering and diffusion bonding Au on the outer surface of the skeletal structure; and
Ti oxide layers formed in clearances between adjacent Au cords of the Au network.

(2) Porous titanium having a low contact resistance according to the above (1), in which the width of at least a part of each of the Au cords of the Au network is 0.3 to 10 μm, preferably 0.4 to 8.0 μm and more preferably 0.5 to 5.0 μm.

(3) Porous titanium having a low contact resistance according to the above (1) or (2), in which the thickness of the Ti oxide layer, which is formed in the clearance between adjacent Au cords of the Au network is 30 to 150 nm, preferably 40 to 135 nm and more preferably 50 to 120 nm.

Referring now to the drawings, the porous titanium having a low contact resistance and a method of producing the same according to the present invention will be described.

FIG. 1 is a drawing of an electron microstructure of the Au network formed on the outer surface of the skeletal structure of the porous titanium body having a low contact resistance according to an aspect of the present invention. In the drawing, an Au cord 5 is formed on the outer skeletal surface and a Ti oxide layer 3 is formed between adjacent Au cords 5.

FIG. 2 is a photograph of an electron microstructure of an Au network formed on an outer skeletal surface of porous titanium having a low contact resistance produced in Example 1, which will be described later, according to an aspect of the present invention.

FIG. 3 is a cross-sectional view of porous titanium having a low contact resistance according to an aspect of the present invention.

FIGS. 4 to 6 are cross-sectional views illustrating a production method of the porous titanium having a low contact resistance shown in FIG. 3 according to an aspect of the present invention.

FIG. 7 is a cross-sectional view of ordinary porous titanium.

FIG. 8 is an enlarged cross-sectional view of an area A of FIG. 7.

FIGS. 9A to 9C are cross-sectional views illustrating an increase in contact resistance when porous titanium having a narrow width of an Au cord in an Au network formed on a surface thereof is immersed in a sulfuric acid solution for a long time.

FIG. 10 is a cross-sectional view illustrating that the width of an Au cord in an Au network formed on a surface of porous titanium having a low contact resistance according to the present invention is preferably in a range of 0.3 to 10 μm at least at one position.

As shown in FIG. 1, in the porous titanium having a low contact resistance according to the present invention, the Au network is formed on the outer surface of the skeletal structure of the porous titanium body and the Ti oxide layers 3 are formed between adjacent Au cords 5 in the Au network. If the width of the Au cord 5 is too narrow, the contact resistance may become high when the porous titanium having the Au network formed on the outer skeletal surface is immersed in, for example, a sulfuric acid solution for a prolonged time.

The reason therefore will be described with reference to FIGS. 9A to 9C. The reference numeral 5 in FIGS. 9A and 9B denotes a schematic cross section of the Au cord shown in FIG. 1. When the porous titanium having the Au network with the Au cord 5 of narrow width S formed on the outer skeletal surface is immersed in a sulfuric acid solution for a prolonged time, the Ti oxide layer 3 grows and increases in thickness T as shown in FIG. 9A. When the Ti oxide layer 3 grows and increases in thickness T, the Ti oxide layer 3 grows below the Au cord 5 from the outer circumference of the Au cord 5 so as to move the Au cord 5 up toward the surface of the Ti oxide layer 3 as shown in FIG. 9B. When this phenomenon further develops, the Au cord 5 is moved upward and removed from the skeleton 2 as shown in FIG. 9C. The Ti oxide layer 3 now exists between the Au cord 5 and the skeleton 2. A diffusion bonding section 6 is eventually absorbed and disappears. As a result, the contact resistance becomes high.

In a structure with the Au cord 5 having a greater width S as shown in FIG. 10, however, even if the thickness T of the Ti oxide layer 3 increases and the Ti oxide layer 3 grows below the Au cord 5 from the outer circumference of the Au cord 5, a long period of time will be required until the Au cord 5 is removed from the skeleton 2 as shown in FIG. 9C. The Au cord 5 is therefore hardly removed from the skeleton formed of titanium metal and the contact resistance hardly becomes high for the duration of normal use. If the width S of the Au cord 5 is less than 0.3 μm, the contact resistance may become higher in a relatively short time when immersed in a sulfuric acid solution. Therefore, the width S of the Au cord 5 is preferably not narrower than 0.3 μm. On the other hand, if the width S of the Au cord 5 is as large as 10 μm or more, stickiness of the Au cord 5 to the skeleton 2 reduces to easily cause separation.

In the porous titanium having a low contact resistance according to the present invention, the Au network is formed on the outer surface of the skeletal structure of the porous titanium body and the adjacent Au cords 5 of the Au network are connected to each other as shown in FIG. 1. Since the Au network is connected also to wider portions of the Au cord 5, even if there is a narrow portion a of the Au cord 5 and that portion a is separated apart from the skeleton 2, the contact resistance never becomes higher when the porous titanium is immersed in, for example, a sulfuric acid solution for a prolonged time so long as the width of the Au cord of the Au network sticking to the outer skeletal surface is in a range of 0.3 to 10 μm at least at one position.

In production of the porous titanium having a low contact resistance according to the present invention, normal porous titanium is prepared first. The normal porous titanium includes the continuous holes 1 opening on a surface and being connected to inner holes as shown in FIGS. 7 and 8. The Ti oxide layer 3, which is a natural oxidation layer, is formed at least on the outer skeletal surface 4 of the skeleton 2.

Next, as shown in FIG. 4, an Au colloid liquid in which extra-fine Au particles are suspended is applied to the Ti oxide layer 3 formed on the outer skeletal surface 4 of normal porous titanium and then dried as quickly as possible. In this manner, an aggregate of the extra-fine Au powder deposits on the Ti oxide layer 3, which is a natural oxidation layer, to form a network structure. The Au colloid liquid may be applied by any method, including using a brush or an airbrush, roll printing, spray coating, transferring and pad printing. Among these, using an airbrush is the most preferable.

The Au colloid liquid is applied on the Ti oxide layer 3, which is a natural oxidation layer, formed on the outer skeletal surface 4 of the porous titanium such that the Au cord 5 occupies 20 to 80% of the surface area of the outer skeletal surface 4. If the application amount is less than 20%, the Au colloid liquid is applied in a granular manner rather than in a network manner. On the other hand, if the application amount is more than 80%, stickiness reduces to easily allow separation.

The Au colloid liquid is applied to the Ti oxide layer 3, then dried in as short a time as possible, and the porous titanium is heated and kept at higher than 300° C. in a vacuum atmosphere. In this manner, as shown in FIG. 5, oxygen included in the Ti oxide layer 3, which is a natural oxidation layer, diffuses into the titanium of the skeleton 2 to form solid solution, and metallic titanium is generated on the outer surface 4 of the porous titanium. When continuously heated under the same condition, as shown in FIG. 6, the Au cord 5 forms the diffusion bonding section 6 so as to firmly stick to the outer skeletal surface 4 of the titanium metal via diffusion bonding.

If the porous titanium is left in an oxidizing atmosphere, such as the ambient atmosphere, with the Au cord 5 firmly sticking to the outer skeletal surface 4 by diffusion bonding, the Au cord 5 adheres via diffusion bonding to the outer skeletal surface 4 of the titanium metal and the Ti oxide layer 3 is formed on the outer skeletal surface 4 at an area where no Au cord 5 exists as illustrated in the cross section of FIG. 3. Since the Ti oxide layer 3 is formed to surround the Au cord 5, the Au cord 5 adheres still more firmly at least to the outer surface of the skeletal structure of the porous titanium body. In this manner, the porous titanium having a low contact resistance according to the present invention is obtained.

The porous titanium having a low contact resistance produced by being left in the oxidizing atmosphere, such as the ambient atmosphere, may include the Ti oxide layer 3 having insufficient thickness. In that case, the thickness of the Ti oxide layer 3 can be increased by heating the porous titanium having a low contact resistance produced by being left in the oxidizing atmosphere, such as the ambient atmosphere, in the ambient atmosphere.

The porous titanium having a low contact resistance according to the present invention shown in the cross section of FIG. 3 may also be produced in the following manner. The Au colloid liquid in which extra-fine Au particles are suspended is applied to the Ti oxide layer 3, which is a natural oxidation layer, formed on the outer skeletal surface 4 of normal porous titanium and then dried in as short a time as possible. The obtained porous titanium as shown in FIG. 4 is heat-treated at the temperature of 300 to 500° C. in the ambient atmosphere. In this case, when the porous titanium as shown in FIG. 4 in which the Au cord 5 sticking to the Ti oxide layer 3, which is a natural oxidation layer, is heat-treated at the temperature of 300 to 500° C. in the ambient atmosphere, oxygen included in the Ti oxide layer 3, which is a natural oxidation layer, diffuses in to the titanium of the skeleton 2 to form solid solution, and metallic titanium is generated on the outer surface 4 of the porous titanium, since the Ti oxide layer 3 which is a natural oxidation layer, directly below the Au cord 5 is not in touch with the ambient air. Then the Au cord 5 forms the diffusion bonding section 6 so as to firmly stick to the outer skeletal surface 4 of the titanium metal via diffusion bonding. Since the porous titanium is treated in the ambient air in the oxidizing atmosphere, the Ti oxide layer 3 is formed to have an increased thickness on the outer skeletal surface 4 in areas where the Au colloid is not deposited and thus no Au cord 5 is provided. Since this thick Ti oxide layer 3 is formed to surround the Au cord 5, the Au cord 5 adheres still more firmly at least to the outer skeletal surface 4 of the porous titanium. In this manner, the bonding structure illustrated in the cross-sectional view of FIG. 3 is provided.

If the Ti oxide layer 3 has a thickness greater than a predetermined thickness, an increase in thickness of the Ti oxide layer 3 becomes slower even if immersed in a sulfuric acid solution for a prolonged time, and thus the contact resistance never increases. Thus, in order to prevent an increase in the contact resistance, the Ti oxide layer 3 preferably has a certain thickness after the application of the Au colloid liquid and heat-treatment.

If the thickness T of the Ti oxide layer 3 formed in the porous titanium having a low contact resistance according to the present invention is not less than 30 nm, growth of the Ti oxide layer 3 in the sulfuric acid solution becomes significantly slow and thus the contact resistance never increases even if the porous titanium is left in the sulfuric acid solution for a prolonged time. On the other hand, if the Ti oxide layer 3 is initially formed by methods such as heating in the ambient air to have a thickness of greater than 150 nm, the initial resistance may disadvantageously increase.

Accordingly, the width S of the Au cord 5 formed on the porous titanium having a low contact resistance according to the present invention is preferably in the range of 0.3 to 10 μm and the thickness T of the Ti oxide layer 3 after heat treatment is preferably in the range of 30 to 150 nm.

In the production of the porous titanium having a low contact resistance according to the present invention, any kind of porous titanium may be used. Examples thereof may include: a fiber sintered body obtained by sintering titanium fiber; a powder sintered body obtained by sintering titanium powder in, for example, a usual sintering process or titanium powder; and sponge-like porous foamed titanium obtained by preparing slurry of titanium powder with, for example, a binder and a foaming agent, extending the slurry on a carrier sheet by, for example, doctor blading, heating the slurry to foam, drying the slurry to provide a green body, and then degreasing and sintering the green body. Among these, the sponge-like porous foamed titanium is preferably used because of its easily-controlled porosity during the production process and of a large contact area.

EFFECTS OF THE INVENTION

The porous titanium having a low contact resistance according to the present invention contributes greatly to an improvement in performance of polymer electrolyte fuel cells in the following aspects. Since the Au cord adheres almost only to the outer skeletal surface via diffusion bonding, an amount of Au used can be reduced as compared with a case in which the Au coating is formed on the entire outer skeletal surface and the entire inner wall of the hole. Accordingly, the porous titanium having a low contact resistance may be used for the air electrode and the fuel electrode of the polymer electrolyte fuel cell at a lower cost. In addition, since the Au cord sticking at least outer surface of the skeletal structure of the porous titanium body having a low contact resistance according to the present invention is covered with a hard Ti oxide layer, the Au cord is not deformed or peeled off even if subjected to outer pressure resulting from, for example, vibration. Furthermore, the contact resistance can be kept low for a prolonged time even if the porous titanium is immersed in a corrosive solution, such as a sulfuric acid solution.

DESCRIPTION OF THE REFERENCE SYMBOLS

Figure 1:
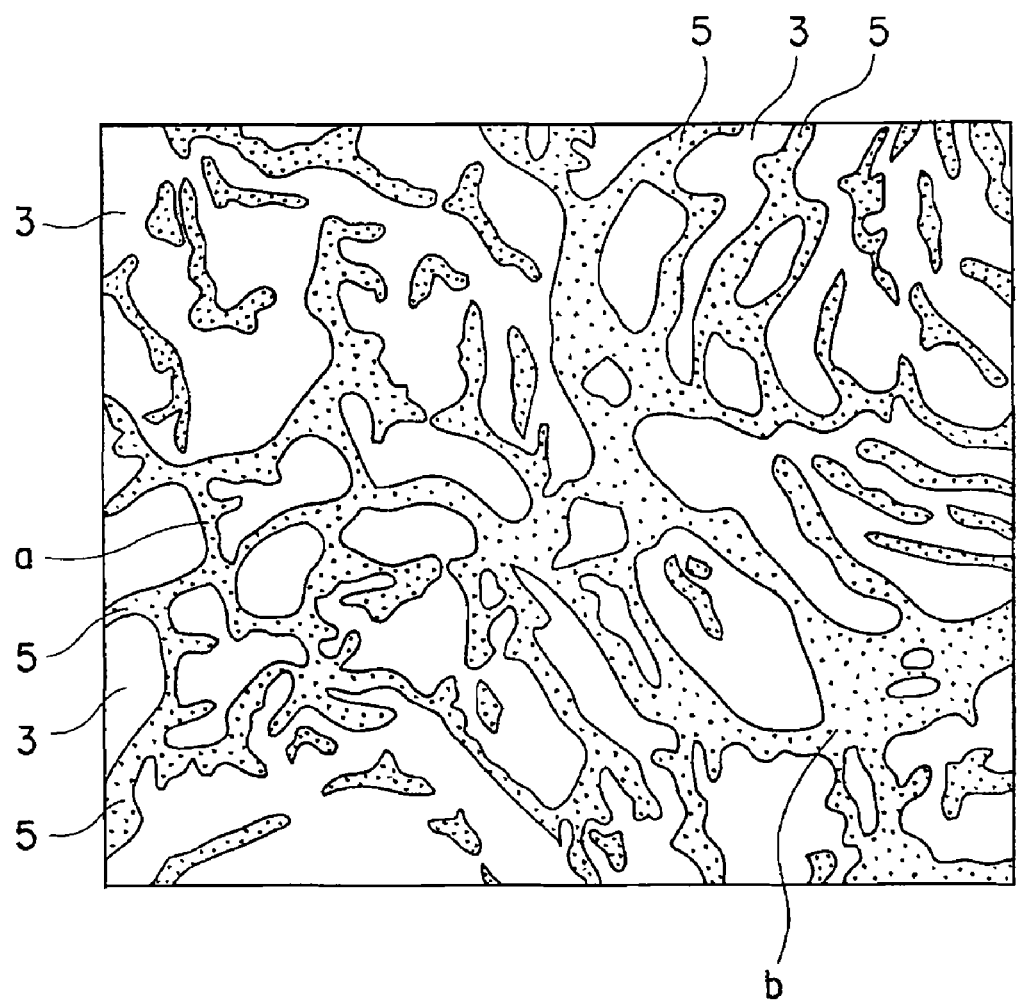
FIG. 1 is a drawing of an electron microstructure of an Au network formed on an outer skeletal surface of porous titanium having a low contact resistance according to an aspect of the present invention.

1: continuous holes
2: skeleton
3: Ti oxide layer
4: outer skeletal surface
5: Au cord
6: diffusion bonding section

BEST MODE FOR CARRYING OUT THE INVENTION

The following substances are prepared: titanium powder having an average particle diameter of 10 micrometer as raw powder; 10% solution of methylcellulose as a water soluble resin binder; ethylene glycol as a plasticizer; alkyl benzene sodium sulfonate as a frothering agent; and neopentane as a foaming agent.

Subsequently, 20 mass % of the raw powder, 10 mass % of the water soluble resin binder, 1 mass % of the plasticizer, 1 mass % of the frothering agent, 0.6 mass % of the foaming agent, and water as the remainder are blended and kneaded for 15 minutes to provide foamed slurry.

The obtained foamed slurry is deposited on a PET film by doctor blading at a blade gap of 0.5 mm, fed to a constant temperature and humidity chamber, and then made to foam at the temperature of 35° C. and humidity of 90% for the duration of 25 minutes. Subsequently, the slurry is air-dried at the temperature of 80° C. for the duration of 20 minutes to provide a sponge-like green compact. The compact is removed from the PET film, placed on an alumina plate, degreased at the temperature of 550° C. for the duration of 180 minutes in an Ar atmosphere, and then sintered in a vacuum sintering furnace in an atmosphere of $5 \times 10^{-3}$ Pa, at the temperature of 1200° C. for the duration of 1 hour. In this manner, a porous foamed titanium plate with porosity of 90% and thickness of 1.0 mm is obtained. The obtained porous foamed titanium plate is cut into pieces of 30 mm in length and 30 mm in width to prepare the porous foamed titanium material.

An Au colloid liquid is prepared in the following process. Chloroauric acid as a main ingredient of Au particles is first dissolved in methanol so that the Au concentration becomes 4.0 mass % with gamma-aminopropyl triethoxysilane as a protecting agent precursor and dimethylamine borane as a reducing agent.

Subsequently, to 8.00 g of gamma-aminopropyl triethoxysilane and 12.00 g of acetylaceton, the methanol solution in which the chloroauric acid has been dissolved is gradually added to prepare a mixed solution. To the mixed solution, a proper amount of dimethylamine borane as a reducing agent is added. Reduction of the mixed solution is conducted while keeping the temperature of the mixed solution at 60° C. and stirring the mixed solution by using a magnetic stirrer. The mixed solution which has undergone the reduction reaction is cooled to room temperature and then desalted by an ultrafiltration method. A proper amount of water is added to adjust the concentration. In this manner, an Au colloid liquid having concentration of 50 mass % with the water as a dispersion medium is obtained.

EXAMPLE 1

The obtained Au colloid liquid was repeatedly sprayed onto the previously prepared porous foamed titanium material and dried immediately. In this manner, the Au network was deposited to the outer skeletal surface of the porous foamed titanium material to coat the surface at the ratio shown in Table 1. The porous foamed titanium material was subjected to heat treatment with the Au network sticking to the outer skeletal surface thereof in the vacuum atmosphere at the temperature shown in Table 1 for the duration of 1 hour and then subjected to heat treatment in the ambient atmosphere at the temperature shown in Table 1 for the duration of 10 minutes. In this manner, the present invention porous titanium samples 1 to 8 and comparative porous titanium samples 1 to 4 to which the Au network adheres via diffusion bonding to the outer skeletal surface of the porous foamed titanium material were produced.

Figure 2:
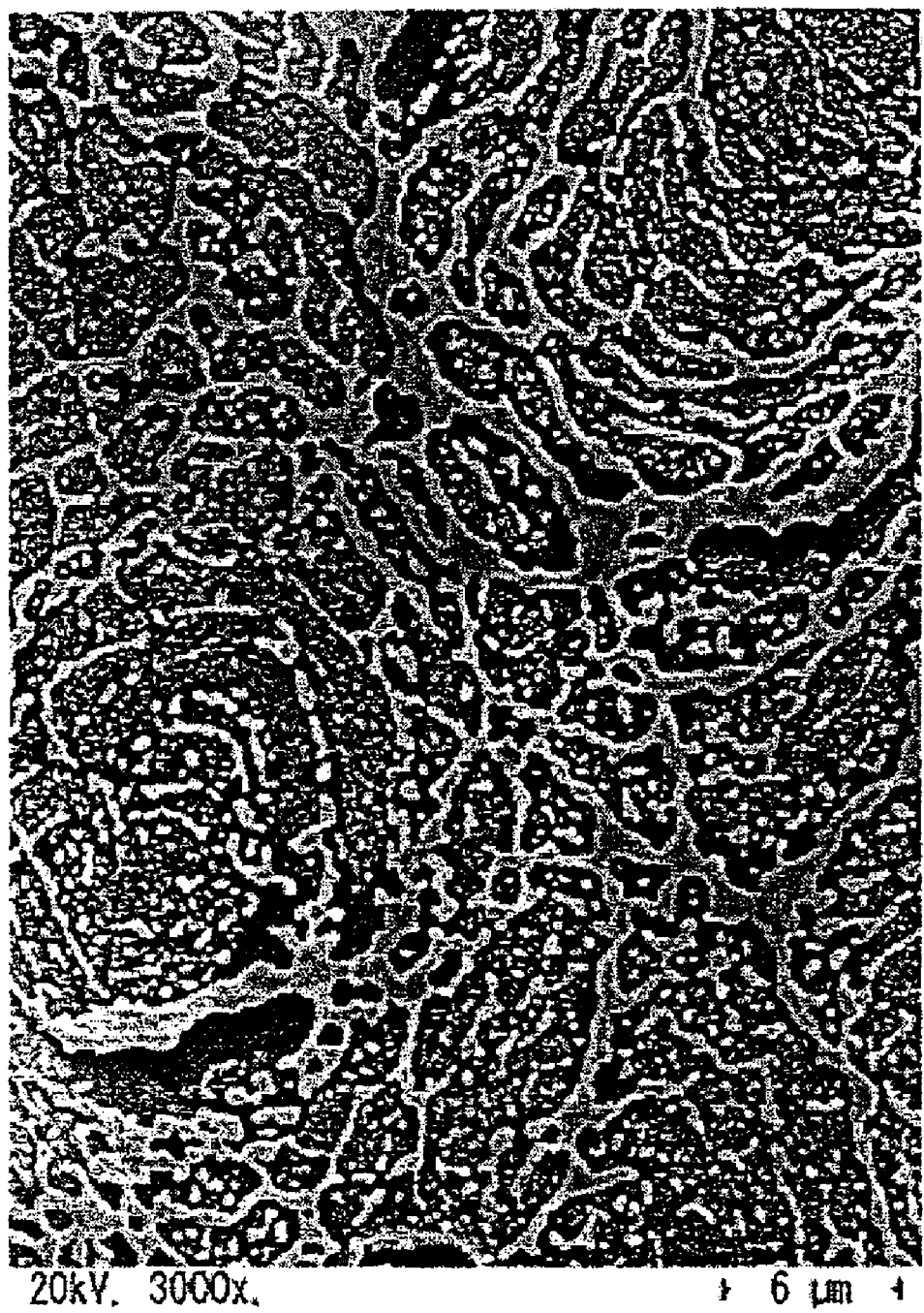
FIG. 2 is a photograph of an electron microstructure of an Au network formed on an outer skeletal surface of porous titanium having a low contact resistance produced in Example 1 according to an aspect of the present invention.
Figure 3:
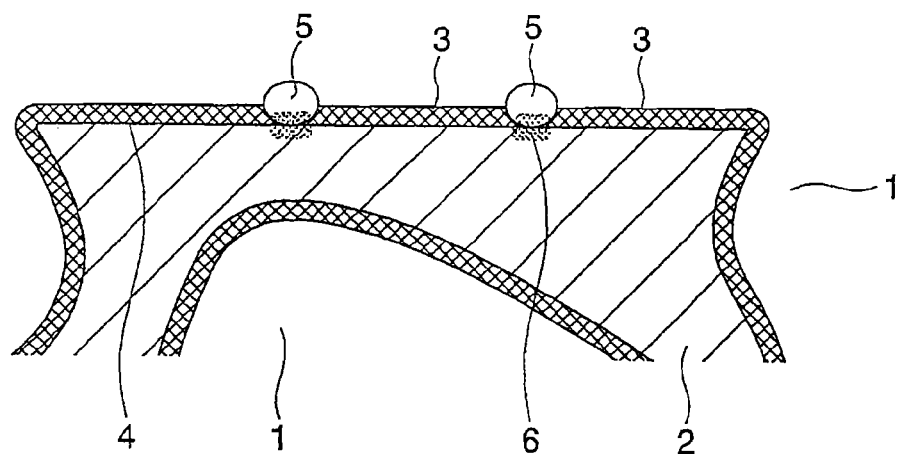
FIG. 3 is a cross-sectional view of porous titanium having a low contact resistance according to an aspect of the present invention.
Figure 4:
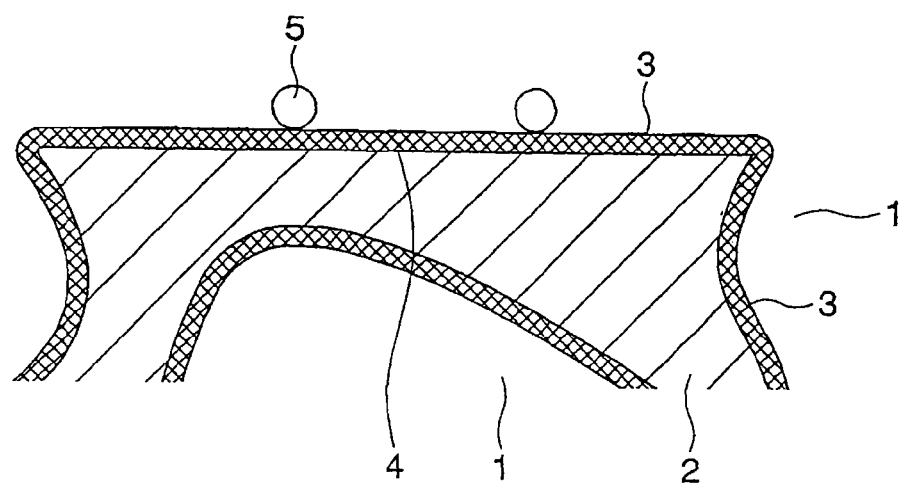
FIG. 4 is cross-sectional view illustrating a production method of the porous titanium having a low contact resistance shown in FIG. 3 according to an aspect of the present invention.
Figure 5:
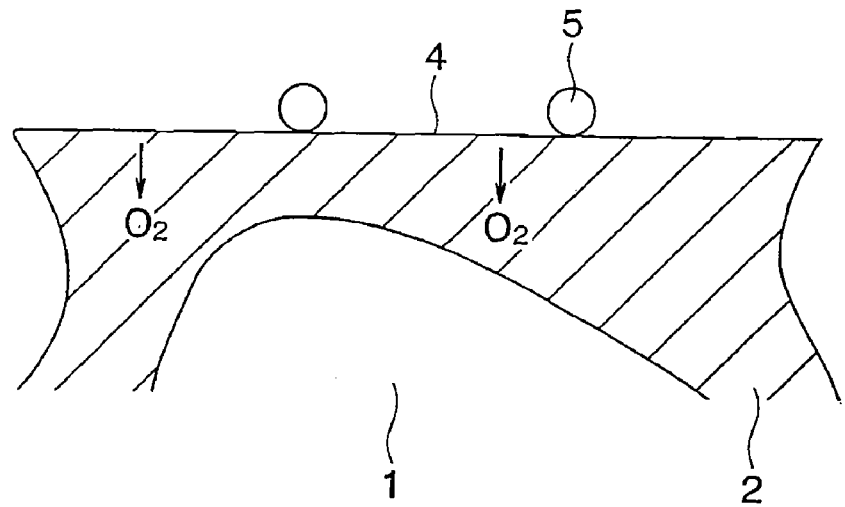
FIG. 5 is cross-sectional view illustrating a production method of the porous titanium having a low contact resistance shown in FIG. 3 according to an aspect of the present invention.
Figure 6:
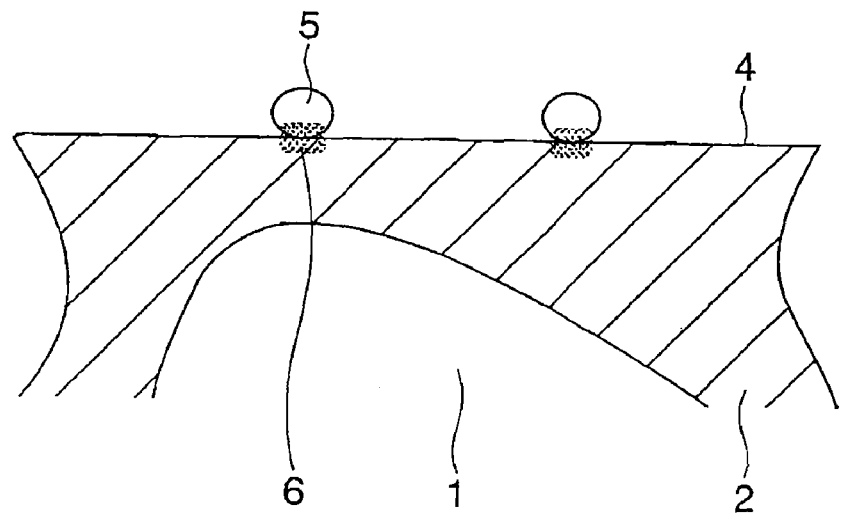
FIG. 6 is cross-sectional view illustrating a production method of the porous titanium having a low contact resistance shown in FIG. 3 according to an aspect of the present invention.
Figure 7:
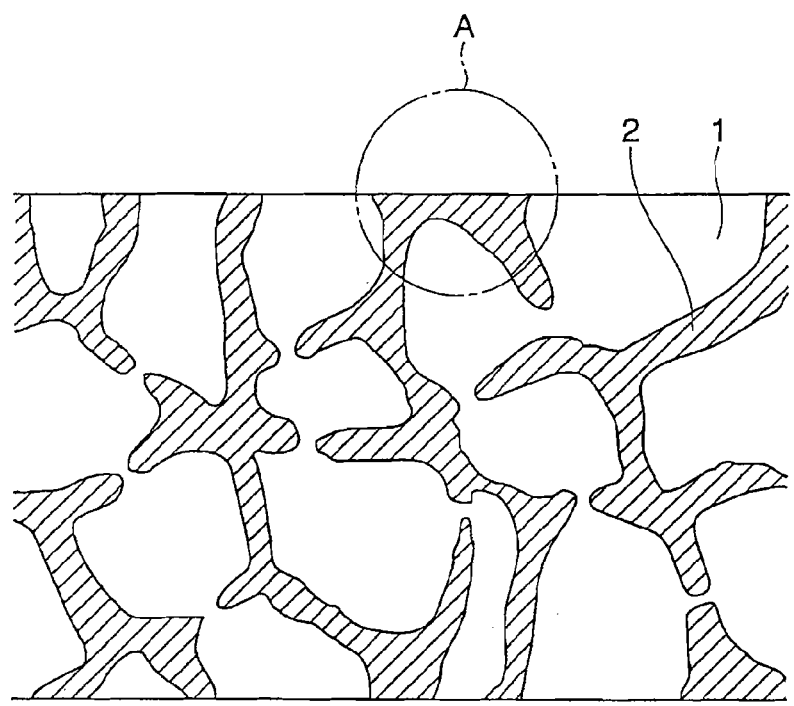
FIG. 7 is a cross-sectional view of ordinary porous titanium.
Figure 8:
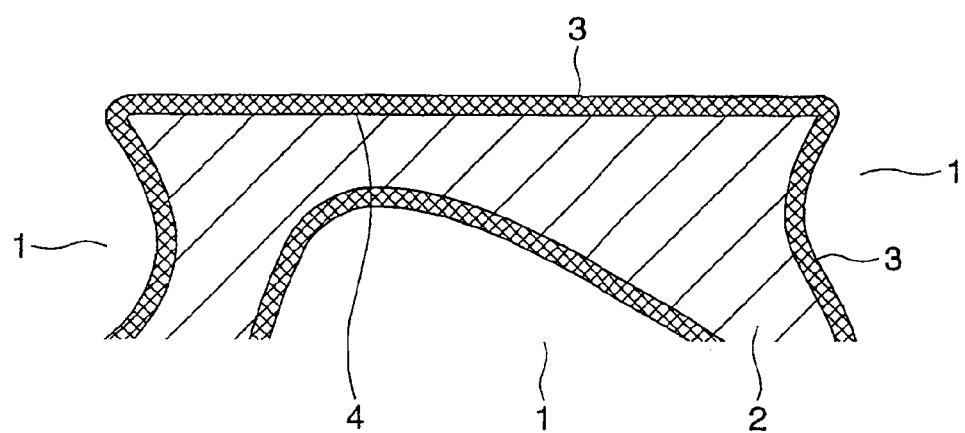
FIG. 8 is an enlarged cross-sectional view of an area A of FIG. 7.
Figure 9A:
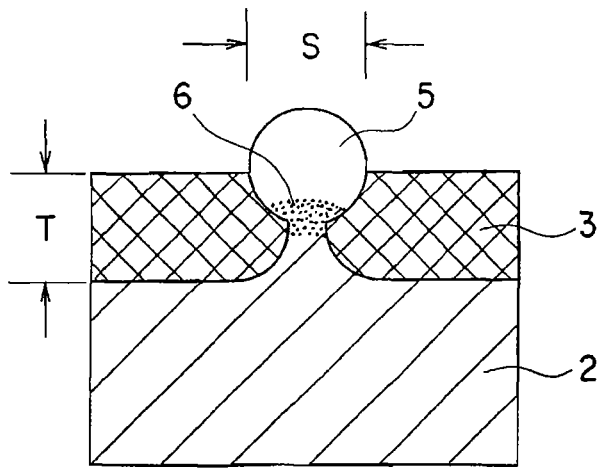
FIG. 9A is cross-sectional view illustrating an increase in contact resistance when porous titanium having a narrow width of an Au cord in an Au network formed on a surface thereof is immersed in a sulfuric acid solution for a long time.
Figure 9B:
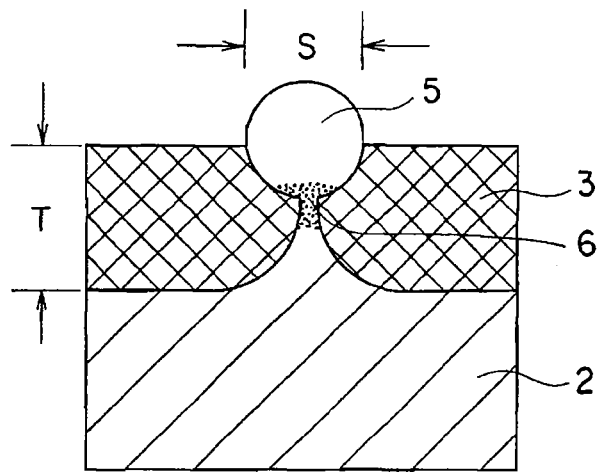
FIG. 9B is cross-sectional view illustrating an increase in contact resistance when porous titanium having a narrow width of an Au cord in an Au network formed on a surface thereof is immersed in a sulfuric acid solution for a long time.
Figure 9C:
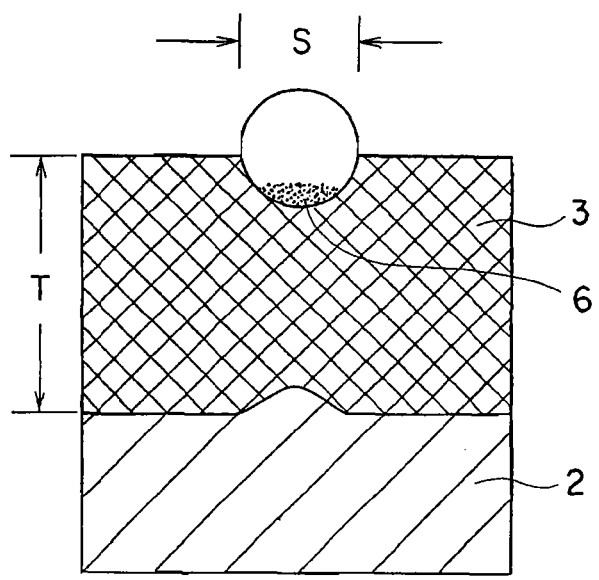
FIG. 9C is cross-sectional view illustrating an increase in contact resistance when porous titanium having a narrow width of an Au cord in an Au network formed on a surface thereof is immersed in a sulfuric acid solution for a long time.
Figure 10:
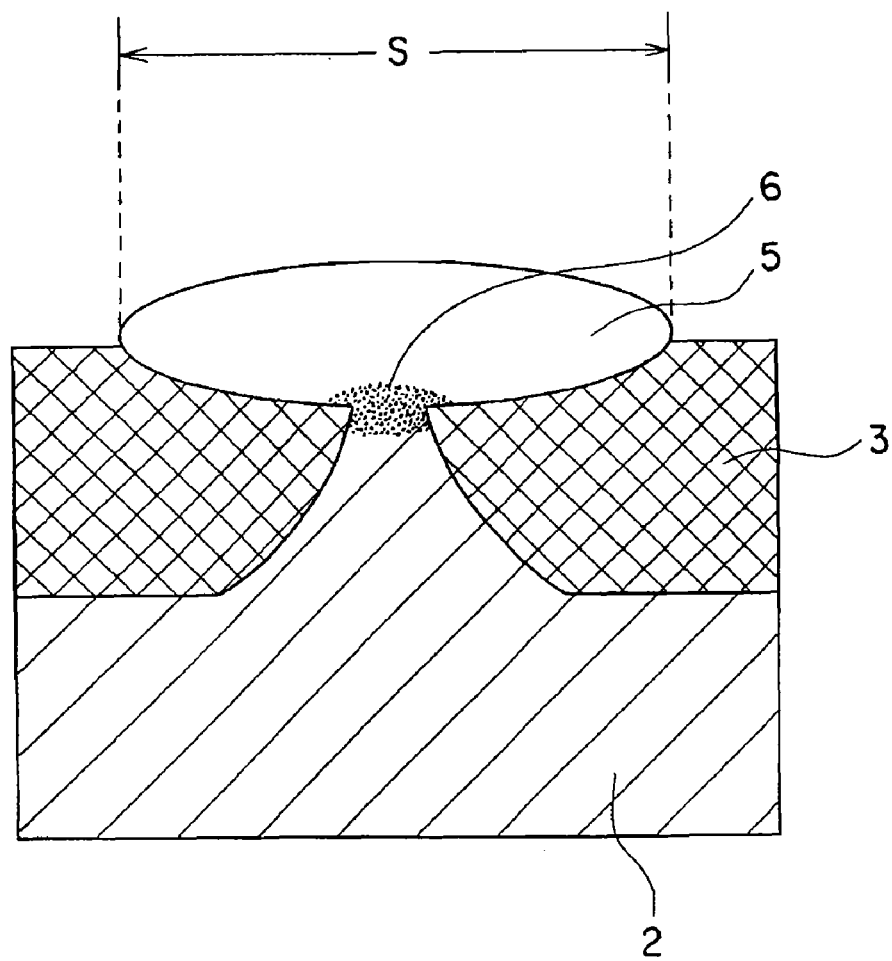
FIG. 10 is a cross-sectional view illustrating that the width of an Au cord in an Au network formed on a surface of porous titanium having a low contact resistance according to the present invention is preferably in a range of 0.3 to 10 μm at least at one position.

The outer skeletal surfaces of the present invention porous titanium samples 1 to 8 and the comparative porous titanium samples 1 to 4 ware observed with an electron microscope and it was found that the Au network was formed in each of these outer skeletal surfaces. The photograph of the electron microstructure of the porous titanium sample 7 is shown in FIG. 2.

The maximum widths of the Au cord of the Au network formed on the outer skeletal surfaces of the present invention porous titanium samples 1 to 8 and the comparative porous titanium samples 1 to 4 were measured. Further, the average thickness of the Ti oxide layer formed in the clearance between adjacent Au cords was measured. The results are shown in Table 1.

REFERENCE EXAMPLE 1

A related art porous titanium sample 1 was prepared by plating Au under normal conditions onto the surface of a previously prepared porous foamed titanium material.

The following fuel cell environmental electrical connection test and the vibration test were conducted on the present invention porous titanium samples 1 to 8 and the comparative porous titanium samples 1 to 4 prepared in Example 1 and on the related art porous titanium sample 1 prepared in the reference example 1.

Fuel Cell Environmental Electrical Connection Test

The present invention porous titanium samples 1 to 8, the comparative porous titanium samples 1 to 4 and the related art porous titanium sample 1 prepared in the reference example 1 ware each immersed in a sulfuric acid solution at the temperature of 50° C. and pH of 2, kept there under the potential of 800 V (with respect to hydrogen) and taken out after 100 hours, 500 hours or 1,000 hours. Then, each of the samples was washed sufficiently with distilled water and dried in the ambient atmosphere. Subsequently, each of the present invention porous titanium samples 1 to 8, the comparative porous titanium samples 1 to 4 and the related art porous titanium sample 1 was placed between two copper plates of 50 mm in length, 50 mm in width and 10 mm in thickness and fixed there via a spring. Each of the samples was then fixed via a spring such that surface pressure between each of the samples and the copper plate was set to 1 MPa. Resistance between the copper plates was measured in this state. The obtained values are shown in Table 1 as the contact resistance values.

Vibration Test

Each of the present invention porous titanium samples 1 to 8, the comparative porous titanium samples 1 to 4 and the related art porous titanium sample 1 were placed between two copper plates of 50 mm in length, 50 mm in width and 10 mm in thickness and fixed there via a spring. Deflection of the spring was adjusted such that surface pressure between each of the samples and the copper plate is set to 1 MPa. Resistance between the copper plates was measured under this load and the obtained values are shown in Table 1 as the contact resistance values before the vibration test.

Subsequently, each of the present invention porous titanium samples 1 to 8, the comparative porous titanium samples 1 to 4 and the related art porous titanium sample 1 were placed between two copper plates of 50 mm in length, 50 mm in width and 10 mm in thickness and fixed there via a spring. Deflection of the spring was adjusted such that surface pressure between each of the samples and the copper plate was set to 1 MPa. Each of the samples was placed on a vibration test facility under the load to undergo the vibration test at a frequency of 67 Hz and vibration acceleration of 70 m/second$^2$ for the duration of 2 hours. After the vibration test, resistance between the copper plates was measured under the load at the site. The obtained values are shown in Table 1 as the contact resistance values after the vibration test.

TABLE 1

| Porous titanium | | Application ratio of Au colloid (%) | Conditions of heat treatment | | Maximum width of Au code (μm) | Average thickness of Ti oxide layer (nm) | Value of contact resistance after fuel cell environmental electrical connection test (mΩ·cm$^2$) | | | | Value of contact resistance (mΩ·cm$^2$) | |
|---|---|---|---|---|---|---|---|---|---|---|---|---|
| | | | Heated temperature in vacuum (° C.) | Heated temperature in ambient air (° C.) | | | Before test | After 100 hours | After 500 hours | After 1000 hours | Before vibration test | After vibration test |
| Present invention | 1 | 20 | 400 | 450 | 0.5 | 50 | 1.9 | 2.2 | 2.2 | 2.3 | 1.9 | 2.1 |
| | 2 | 30 | 500 | 500 | 0.5 | 100 | 2.2 | 2.3 | 2.5 | 2.5 | 2.2 | 2.4 |
| | 3 | 40 | 400 | 450 | 1 | 50 | 1.6 | 1.8 | 1.9 | 2.0 | 1.6 | 1.8 |
| | 4 | 50 | 500 | 470 | 1 | 75 | 1.5 | 1.8 | 1.9 | 1.9 | 1.5 | 1.5 |
| | 5 | 20 | 450 | 430 | 0.3 | 30 | 2.0 | 2.5 | 2.5 | 2.5 | 2.0 | 2.8 |
| | 6 | 50 | 400 | 430 | 3 | 30 | 1.4 | 1.6 | 1.6 | 1.6 | 1.4 | 1.8 |
| | 7 | 60 | 420 | 450 | 5 | 50 | 1.4 | 1.5 | 1.6 | 1.6 | 1.4 | 1.7 |
| | 8 | 70 | 420 | 500 | 10 | 100 | 1.9 | 2.0 | 2.1 | 2.1 | 1.9 | 2.3 |
| Comparative | 1 | 30 | 400 | 600 | 0.5 | 250* | 15 | 16 | 16 | 17 | 15 | 15 |
| | 2 | 30 | 500 | 300 | 0.3 | 10* | 1.9 | 3.4 | 7.8 | 40 | 1.9 | 2.0 |
| | 3 | 5 | 450 | 500 | 0.05* | 100 | 40 | 41 | 45 | 45 | 40 | 40 |
| | 4 | 85 | 400 | 500 | 12* | 100 | 1.9 | 2.1 | 2.1 | 2.1 | 1.9 | 7.8 |
| Related art 1 | | Normal Au plating | | | — | — | 1.3 | 1.3 | 1.4 | 1.4 | 1.3 | 5.5 |

*represents values out of the range of the present invention.

From the result shown in Table 1, the present invention porous titanium samples 1 to 8 had considerably less contact resistance after the fuel cell environmental electrical connection test as compared with the related art porous titanium sample 1, and had considerably smaller variation in contact resistance both before and after the vibration test. The Comparative porous titanium samples 1 to 4, which are out of the range of the present invention, had unacceptable results.

EXAMPLE 2

The previously obtained Au colloid liquid is diluted with ethanol so that the Au content became 4 mass %. The diluted Au colloid liquid was repeatedly sprayed onto the previously prepared porous foamed titanium material using an airbrush (TAB-02 manufactured by TRUSCO) at an air pressure of 0.1 MPa to coat the outer skeletal surface of the porous foamed titanium material at the ratio shown in Table 2. The Au colloid liquid is dried immediately to deposit the Au network to the outer skeletal surface of the porous foamed titanium material. The porous foamed titanium material was subjected to heat treatment with the Au network sticking to the outer skeletal surface thereof in the vacuum atmosphere at the temperature shown in Table 2 for the duration of 1 hour and then subject to heat treatment in the ambient atmosphere at the temperature shown in Table 2 for the duration of 10 minutes. In this manner, the present invention porous titanium samples 9 to 16 to which the Au network stuck via diffusion bonding to the outer skeletal surface of the porous foamed titanium material were produced.

The outer skeletal surfaces of the present invention porous titanium samples 9 to 16 were observed with an electron microscope and it was found that the Au network is formed in each of these outer skeletal surfaces. The maximum widths of the Au cord of the Au network formed on the outer skeletal surfaces of the present invention porous titanium samples 9 to 16 were measured. Further, the average thickness of the Ti oxide layer formed in the clearance between adjacent Au cords was measured. The results are shown in Table 2.

EXAMPLE 3

The previously obtained Au colloid liquid was diluted with ethanol so that the Au content became 4 mass %. The diluted Au colloid liquid was repeatedly sprayed onto the previously prepared porous foamed titanium material using an airbrush (TAB-02 manufactured by TRUSCO) at the air pressure of 0.1 MPa to coat the outer skeletal surface of the porous foamed titanium material at the ratio shown in Table 3. The Au colloid liquid was dried immediately to deposit the Au network to the outer skeletal surface of the porous foamed titanium material. The porous foamed titanium material was subjected to heat treatment with the Au network sticking to the outer skeletal surface thereof in the ambient atmosphere at the temperature shown in Table 3 for the duration of 30 minutes. In this manner, the present invention porous titanium samples 17 to 24 to which the Au network stuck via diffusion bonding to the outer skeletal surface of the porous foamed titanium material were produced.

The outer skeletal surfaces of the present invention porous titanium samples 17 to 24 were observed with an electron microscope and it was found that the Au network was formed in each of these outer skeletal surfaces. The maximum widths of the Au cord of the Au network formed on the outer skeletal surfaces of the present invention porous titanium samples 17 to 24 were measured. Further, the average thickness of the Ti oxide layer formed in the clearance between adjacent Au cords was measured. The results are shown in Table 3.

TABLE 2

| Porous titanium | | Application ratio of Au colloid (%) | Conditions of heat treatment | | Maximum width of Au code (μm) | Average thickness of Ti oxide layer (nm) | Value of contact resistance after fuel cell environmental electrical connection test (mΩ·cm$^2$) | | | | Value of contact resistance (mΩ·cm$^2$) | |
|---|---|---|---|---|---|---|---|---|---|---|---|---|
| | | | Heated temperature in vacuum (°C.) | Heated temperature in ambient air (°C.) | | | Before test | After 100 hours | After 500 hours | After 1000 hours | Before vibration test | After vibration test |
| Present invention | 9 | 20 | 400 | 400 | 0.4 | 50 | 2.0 | 2.1 | 2.2 | 2.3 | 2.0 | 2.3 |
| | 10 | 30 | 500 | 420 | 0.5 | 50 | 2.5 | 2.5 | 2.6 | 2.7 | 2.5 | 2.6 |
| | 11 | 40 | 400 | 500 | 1 | 100 | 2.5 | 2.5 | 2.5 | 2.6 | 2.5 | 2.5 |
| | 12 | 50 | 500 | 470 | 2 | 80 | 2.4 | 2.6 | 2.6 | 2.7 | 2.4 | 2.7 |
| | 13 | 30 | 450 | 400 | 0.6 | 40 | 2.0 | 2.2 | 2.3 | 2.4 | 2.0 | 2.3 |
| | 14 | 50 | 400 | 400 | 1.8 | 40 | 2.0 | 2.3 | 2.3 | 2.3 | 2.0 | 2.1 |
| | 15 | 60 | 420 | 450 | 3 | 70 | 2.2 | 2.2 | 2.3 | 2.3 | 2.2 | 2.5 |
| | 16 | 80 | 400 | 450 | 10 | 70 | 2.1 | 2.2 | 2.2 | 2.2 | 2.1 | 2.5 |

TABLE 3

| | Porous titanium | Application ratio of Au colloid (%) | Conditions of heat treatment Heated temperature in ambient air (° C.) | Maximum width of Au code (μm) | Average thickness of Ti Oxide layer (nm) | Value of contact resistance after fuel cell environmental electrical connection test (mΩ · cm²) | | | | Value of contact resistance (mΩ · cm²) | |
|---|---|---|---|---|---|---|---|---|---|---|---|
| | | | | | | Before test | After 100 hours | After 500 hours | After 1000 hours | Before vibration test | After vibration test |
| Present invention | 17 | 20 | 400 | 0.5 | 50 | 2.2 | 2.4 | 2.5 | 2.6 | 2.2 | 2.5 |
| | 18 | 30 | 450 | 0.6 | 100 | 2.7 | 2.7 | 2.7 | 2.8 | 2.7 | 2.9 |
| | 19 | 40 | 350 | 1.0 | 40 | 2.5 | 2.7 | 2.8 | 2.9 | 2.5 | 2.7 |
| | 20 | 50 | 300 | 1.8 | 30 | 2.2 | 2.5 | 2.6 | 2.7 | 2.2 | 2.7 |
| | 21 | 50 | 400 | 3.0 | 40 | 2.5 | 2.6 | 2.6 | 2.8 | 2.5 | 2.7 |
| | 22 | 50 | 500 | 2.3 | 120 | 2.8 | 2.8 | 2.8 | 2.9 | 2.8 | 2.9 |
| | 23 | 60 | 400 | 5 | 60 | 2.2 | 2.3 | 2.4 | 2.5 | 2.2 | 2.6 |
| | 24 | 80 | 400 | 10 | 70 | 2.1 | 2.4 | 2.4 | 2.5 | 2.1 | 2.6 |

From the result shown in Tables 2 and 3, the present invention porous titanium samples 9 to 24 have considerably smaller values of contact resistance after the fuel cell environmental electrical connection test as compared with the related art porous titanium sample 1 shown in Table 1, and have considerably smaller variation in contact resistance both before and after the vibration test.

INDUSTRIAL APPLICABILITY

The porous titanium having a low contact resistance according to the present invention contributes greatly to an improvement in performance of polymer electrolyte fuel cells in the following aspects. Since the Au cord adheres almost only to the outer skeletal surface via diffusion bonding, an amount of Au used can be reduced as compared with a case in which the Au coating is formed on the entire outer skeletal surface and the entire inner wall of the hole. Accordingly, the porous titanium having a low contact resistance may be used for the air electrode and the fuel electrode of the polymer electrolyte fuel cell at a lower cost. In addition, since the Au cord sticking at least outer surface of the skeletal structure of the porous titanium body having a low contact resistance according to the present invention is covered with a hard Ti oxide layer, the Au cord does not deform or peel off even if subjected to outer pressure resulting from, for example, vibration. Furthermore, the contact resistance can be kept low for a prolonged period of time even if the porous titanium is immersed in a corrosive solution, such as a sulfuric acid solution. Accordingly, the present invention has excellent industrial applicability.

The invention claimed is:

1. A porous titanium having a low contact resistance comprising:
    a porous titanium body having a skeletal structure and continuous holes that opens on an outer surface of the porous titanium body and are connected to each other to form inner holes;
    an Au network formed on at least an outer surface of the skeletal structure of the porous titanium body as a continuous network structure by adhering and diffusion bonding Au on the outer surface of the skeletal structure; and
    Ti oxide layers formed in clearances between adjacent Au cords of the Au network.

2. The porous titanium having a low contact resistance according to claim 1, wherein the width of at least a part of each of the Au cords of the Au network is 0.3 to 10 μm.

3. The porous titanium having a low contact resistance according to claim 1, wherein the thickness of the Ti oxide layer formed in the clearance between adjacent Au cords of the Au network is 30 to 150 nm.

4. The porous titanium having a low contact resistance according to claim 2, wherein the thickness of the Ti oxide layer formed in the clearance between adjacent Au cords of the Au network is 30 to 150 nm.

* * * * *